US008949663B2

(12) United States Patent
 Ueda (10) Patent No.: US 8,949,663 B2
(45) Date of Patent: Feb. 3, 2015

(54) MULTI-CORE PROCESSOR INCLUDING A MONITORED PROCESSOR CORE WHOSE PROCESS RESULT IS TO BE MONITORED BY A NUMBER OF PROCESSORS BASED ON PROCESSING LOAD

(75) Inventor: Koji Ueda, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 225 days.

(21) Appl. No.: 13/517,139

(22) PCT Filed: Dec. 13, 2011

(86) PCT No.: PCT/JP2011/078820
§ 371 (c)(1),
(2), (4) Date: Jun. 19, 2012

(87) PCT Pub. No.: WO2013/088519
PCT Pub. Date: Jun. 20, 2013

(65) Prior Publication Data
US 2013/0151814 A1 Jun. 13, 2013

(51) Int. Cl.
*G06F 11/00* (2006.01)
*G06F 11/30* (2006.01)

(52) U.S. Cl.
USPC .................. 714/10; 714/11; 714/15; 714/21; 718/104

(58) Field of Classification Search
USPC ........ 714/15, 21, 31, 38, 49, 10, 11; 718/102, 718/103, 104, 105
See application file for complete search history.

(56) References Cited

U.S. PATENT DOCUMENTS

| | | | | |
|---|---|---|---|---|
| 7,260,741 B2* | 8/2007 | Fitzgerald | ......................... | 714/13 |
| 7,483,817 B2* | 1/2009 | Mishuku | ........................ | 702/186 |
| 7,739,527 B2* | 6/2010 | Rothman et al. | ............... | 713/320 |
| 7,774,657 B1* | 8/2010 | Hardman | ...................... | 714/47.1 |
| 7,796,061 B2* | 9/2010 | Kee | ................................. | 341/95 |

(Continued)

FOREIGN PATENT DOCUMENTS

| | | |
|---|---|---|
| JP | 11 85713 | 3/1999 |
| JP | 2004 38766 | 2/2004 |

(Continued)

OTHER PUBLICATIONS

International Search Report Issued Feb. 14, 2012 in PCT/JP11/78820 Filed Dec. 13, 2011.

*Primary Examiner* — Joseph Schell
(74) *Attorney, Agent, or Firm* — Oblon, Spivak, McClelland, Maier & Neustadt, L.L.P.

(57) ABSTRACT

A multi-core processor includes a monitored processor core whose process result is to be monitored; a monitoring processor core group including two or more monitoring processors which can perform a process for monitoring the monitored processor core; an evaluating part configured to evaluate a processing load of the monitoring processor core group; and a controlling part configured to make the monitoring processor core group perform the process for monitoring the monitored processor core in a distributed manner if the processing load of the monitoring processor core group evaluated by the evaluating part is low, and make the monitoring processor of the monitoring processor core group perform the process for monitoring the monitored processor core if the processing load of the monitoring processor core group evaluated by the evaluating part is high, the monitoring processor performing a process whose priority is relatively low.

4 Claims, 5 Drawing Sheets

(56) References Cited

U.S. PATENT DOCUMENTS

| | | | |
|---|---|---|---|
| 7,996,842 B2 * | 8/2011 | Savit | 718/104 |
| 8,200,163 B2 * | 6/2012 | Hoffman | 455/67.11 |
| 8,327,126 B2 * | 12/2012 | Bell et al. | 713/100 |
| 8,468,532 B2 * | 6/2013 | Aguilar et al. | 718/103 |
| 8,516,492 B2 * | 8/2013 | Vaddagiri | 718/105 |
| 8,631,415 B1 * | 1/2014 | Nadathur et al. | 718/105 |
| 2009/0241124 A1 * | 9/2009 | Denneau et al. | 718/105 |

FOREIGN PATENT DOCUMENTS

| | | |
|---|---|---|
| JP | 2008 191949 | 8/2008 |
| JP | 2008 305317 | 12/2008 |
| JP | 2009 29172 | 2/2009 |
| JP | 2011 113399 | 6/2011 |

* cited by examiner

| TASK | PRIORITY |
|---|---|
| TASK A | HIGH |
| TASK B | MIDDLE |
| TASK C | MIDDLE |
| TASK D | LOW |
| ⋮ | ⋮ |

| PRIORITY | MONITORING PROCESS AT THE TIME OF LOW LOAD | MONITORING PROCESS AT THE TIME OF HIGH LOAD |
|---|---|---|
| HIGH | − | − |
| MIDDLE | DISTRIBUTED PROCESS | − |
| MIDDLE | DISTRIBUTED PROCESS | − |
| LOW | DISTRIBUTED PROCESS | CONCENTRATED PROCESS |
| ⋮ | ⋮ | ⋮ |

FIG.5

MULTI-CORE PROCESSOR INCLUDING A MONITORED PROCESSOR CORE WHOSE PROCESS RESULT IS TO BE MONITORED BY A NUMBER OF PROCESSORS BASED ON PROCESSING LOAD

TECHNICAL FIELD

The present invention is related to a multi-core processor which includes plural processor cores, each processor core being capable of performing a process independently.

BACKGROUND ART

A multi-core processor is known in which plural processor cores (CPU cores) are installed in a package and the respective processor cores are capable of performing the processes independently in parallel. The multi-core processor becomes widespread because of its capability of parallel processing, and is suited as a controller in a movable object, etc., because of its multi-functionality.

If a computer is used as the controller in a movable object, etc., high reliability is required with respect to its process result.

Patent Document 1 discloses a multi-core processor in which plural processor cores are installed. In this multi-core processor, the installed processor cores perform the same calculation and compare the process results with each other to perform self-diagnosis for determining whether they are normal. If it is determined by the self-diagnosis that they are normal, steering control is performed.

[Patent Document 1] Japanese Laid-open Patent Publication No. 2009-029172

DISCLOSURE OF INVENTION

Problem to be Solved by Invention

However, in the disclosed technique for improving the reliability, the same process is performed only for the comparison, which leads to a redundant configuration, and thus, there is a problem that a large amount of CPU resources is consumed and the processor cannot implement a performance appropriate to cost.

The present invention is made to solve such a problem and a main object of the present invention is to provide a multi-core processor in which respective processor cores can implement sufficient performance while keeping reliability of process results.

Means to Solve the Problem

In order to achieve the object described above, an embodiment of the present invention is
a multi-core processor which includes:
a monitored processor core whose process result is to be monitored;
 a monitoring processor group including two or more monitoring processors which can perform a process for monitoring the monitored processor core;
 an evaluating part configured to evaluate a processing load of the monitoring processor group; and
 a controlling part configured to make the monitoring processor group perform the process for monitoring the monitored processor core in a distributed manner if the processing load of the monitoring processor group evaluated by the evaluating part is low, and make the monitoring processor of the monitoring processor group perform the process for monitoring the monitored processor core if the processing load of the monitoring processor group evaluated by the evaluating part is high, the monitoring processor performing a process whose priority is relatively low.

According to the embodiment of the invention, since the monitoring processor group is made to perform the process for monitoring the monitored processor core in a distributed manner, if the processing load of the monitoring processor group evaluated by the evaluating part is low, and the monitoring processor of the monitoring processor group, which is performing a process whose priority is relatively low, is made to perform the process for monitoring the monitored processor core if the processing load of the monitoring processor group evaluated by the evaluating part is high, it is possible to provide a multi-core processor in which the respective processor cores can implement sufficient performance while keeping reliability of the process results.

According to an embodiment of the present invention,
 the controlling part makes the monitoring processor of the monitoring processor group perform the process for monitoring the monitored processor core if the processing load of the monitoring processor group evaluated by the evaluating part is high, the monitoring processor performing a process whose priority is the lowest, for example.

Further, according to an embodiment of the present invention,
 the evaluating part evaluates the processing load of the monitoring processor core group such that the processing load becomes high if an average value of CPU usage percentages in the monitoring processor core group exceeds a reference value, for example.

Further, according to an embodiment of the present invention,
 the process for monitoring the monitored processor core includes performing the same process as the monitored processor core and comparing the result of the process with the process result of the monitored processor core, for example.

Advantage of the Invention

According to the present invention, it is possible to provide a multi-core processor in which respective processor cores can implement sufficient performance while keeping reliability of process results.

DESCRIPTION OF REFERENCE SYMBOLS 1 multi-core processor
10 program memory 12 operating system
12A task scheduler
12B processing load evaluating part
14 application program
15 instruction fetch bus
20#1 through 20#4 processor cores
30 shared memory
32 OS usage area
32A priority table
34 application usage area
34A through 34D task-specific usage areas
35 data bus

BEST MODE FOR CARRYING OUT THE
INVENTION

In the following, a mode for carrying out the present invention will be described by referring to embodiments with reference to the accompanying drawings.

Embodiment

In the following, a multi-core processor 1 according to an embodiment of the present invention will be described with reference to the accompanying drawings. The multi-core processor 1 according to the embodiment is suited for a controller installed in a movable object such as a vehicle.

[Configuration]

Figure 1:
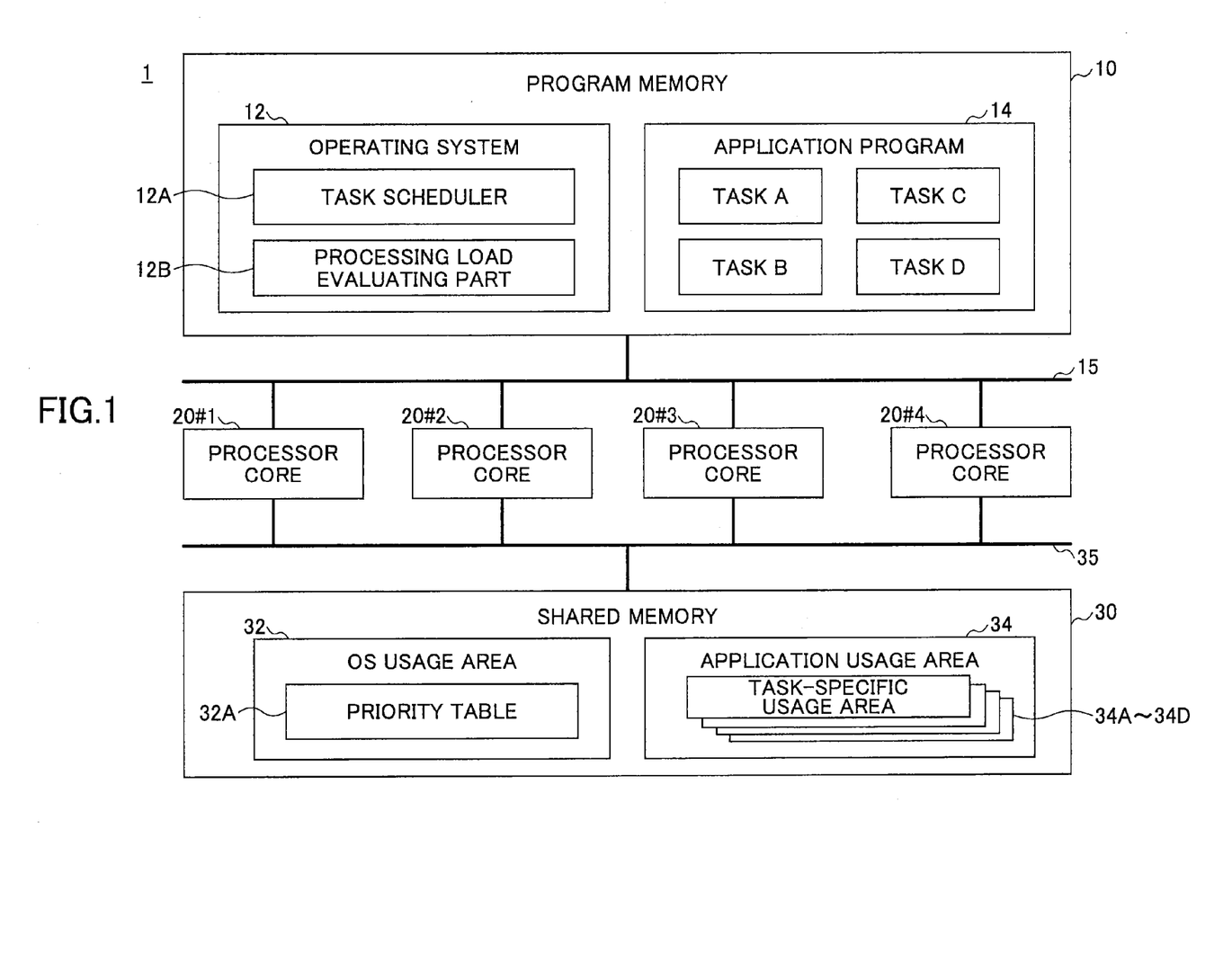
FIG. 1 is a diagram for illustrating a configuration example of a multi-core processor 1 according to a first embodiment.

FIG. 1 is a diagram for illustrating a configuration example of a multi-core processor 1 according to a first embodiment. The multi-core processor 1 includes, as main components, a program memory 10, processor cores (CPU cores) 20#1, 20#2, 20#3 and 20#4, and a shared memory 30. In the following, the processor cores 20#1, 20#2, 20#3 and 20#4 are collectively referred to as "the respective processor cores", as necessary. It is noted that the number of the processor cores is four in the embodiment; however, the number of the processor cores is arbitrary as long as it is greater than or equal to three.

The program memory 10 is a nonvolatile memory such as ROM (Read-Only Memory), a flash ROM, an EEPROM (Electrically Erasable and Programmable Read-Only Memory), HDD (Hard Disk Drive). The program memory 10 stores programs which are executed by the respective processor cores.

The programs which are executed by the respective processor cores include an operating system 12 and an application program 14. The program memory 10 outputs an instruction, which is stored in an address input from the respective processor cores, to the respective processor cores via an instruction fetch bus 15.

The operating system 12 includes a task scheduler 12A and a processing load evaluating part 12B. The operating system 12 may be executed by one of the respective processors (the processor core 20#1, for example).

The application program 14 includes a task A, a task B, a task C and a task D, for example. The task includes an instruction group which has the same functionality to a degree. In the embodiment, tasks A through D are allocated such that the processor core 20#1 executes the task A, the processor core 20#2 executes the task B, the processor core 20#3 executes the task C and the processor core 20#4 executes the task D.

The task scheduler 12A performs the allocation of the tasks as described above and determination of processing schedule with respect to the respective processor cores.

The processing load evaluating part 12B determines whether processing loads of the processor cores 20#2 through 20#4, which correspond to monitoring processor cores, are high or low, as described hereinafter. The processing loads of the processor cores 20#2 through 20#4 may be evaluated by various methods. For example, the processing load evaluating part 12B calculates CPU usage percentages of the processor cores 20#2 through 20#4, and evaluates the processing loads of the processor cores 20#2 through 20#4 such that the processing loads of the processor cores 20#2 through 20#4 are high if an average value of the CPU usage percentages exceeds a reference value (80 percent, for example) and low if the average value of the CPU usage percentages is smaller than or equal to the reference value. The CPU usage percentage indicates a ratio of time, in which the processor core is occupied by software which is being executed, to a certain specified period. It is noted that it is desirable that the task B, the task C and the task D are adjusted in advance such that the CPU usage percentages in a normal state are smaller than or equal to the reference value. As a result of this, a "distributed monitoring mode" described hereinafter is adopted in a normal state, and a "concentrated monitoring mode" described hereinafter is adopted only if the processing loads are high.

In the case where the multi-core processor according to the embodiment is installed in the vehicle, the tasks A through D includes various processes such as a process for controlling an ignition timing of an engine, a process for controlling a throttle opening rate, a process for controlling a starter motor, a process for controlling a brake apparatus, a process for controlling a steering apparatus and a process for controlling a navigation apparatus.

Each of the respective processor cores includes an instruction fetch unit, an ALU (Arithmetic Logic Unit), a MUL (a multiplier), a DIV (a divider), LSU (Load Store Unit), and other calculation units, an internal memory such as a register and a cache memory, a program counter, a local interrupt controller, etc., for example.

It is noted that it is desirable that the multi-core processor 1 is a SMP (Symmetry Multi-core Processor) in which the respective processor cores has comparable performance. This is because in the "concentrated monitoring mode", there is an occasion in which a monitored processor core and a monitoring processor core perform the same calculation simultaneously.

The memory 30 is a RAM (Random Access Memory), for example. The memory 30 can perform reception and transmission of data from and to the respective processor cores via a data bus 35.

In the memory 30 are set an OS usage area 32 which is used by the operating system 12 and an application usage area 34 which is used by the application program 14. In the OS usage area 32 is stored a priority table 32A, etc. In the priority table 32A is defined priority of the tasks. The priority table 32A is read from the ROM or the like at the time of starting the multi-core processor 1, for example, and written to a predetermined area of the memory 30 for use.

Figure 2:
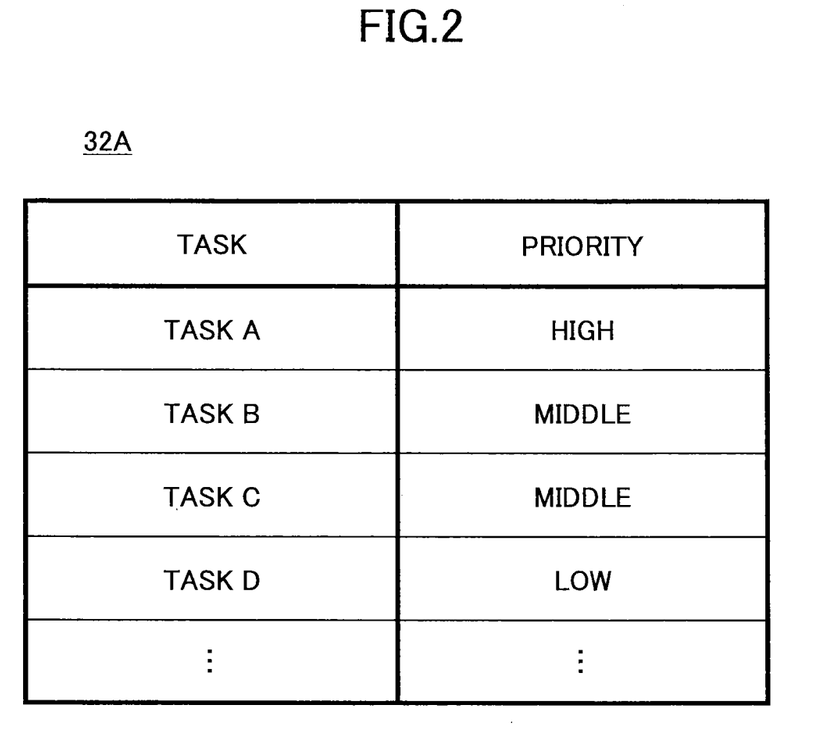
FIG. 2 is a diagram for illustrating an example of data in a priority table 32A.

FIG. 2 is a diagram for illustrating an example of data in the priority table 32A. According to the embodiment, the highest priority "high" is set to the task A, intermediate priority "middle" is set to the task B and the task C, and the lowest priority "low" is set to the task D.

In the application usage area 34 are included task-specific usage areas 34A through 34D which are used by the task A, the task B, the task C and the task D.

[Monitoring Function]

According to the multi-core processor 1 of the present embodiment, a process for monitoring whether the processor core, which executes the task which is set the highest priority "high", is operating normally is performed by other processor cores. According to the embodiment, the processor core 20#1 which executes the task A corresponds to the monitored processor core to be monitored, and other processor cores 20#2 through 20#4 are the monitoring processor cores which perform a monitoring process.

Specifically, the processor cores 20#2 through 20#4 monitor whether the processor core 20#1 operates normally by executing the same process as the processor core 20#1 and comparing the process results of their own with the process result of the processor core 20#1. Such a process is referred to as a "monitoring process" hereinafter.

In order to perform the monitoring process, it is necessary to share an operand to be processed by the processor core 20#1 and obtain the process result of the processor core 20#1. In the present embodiment, the operand to be used for the calculation by the processor core 20#1 and the process result of the processor core 20#1 are written to the task-specific usage area 34A. The processor cores 20#2 through 20#4 are permitted (temporarily or constantly) to read data from the task-specific usage areas 34A.

The instruction to perform the monitoring process is output by the task scheduler 12A. The task scheduler 12A determines the tasks to be executed by the processor cores 20#2 through 20#4 such that the processor cores 20#2 through 20#4 can perform the monitoring process while performing the tasks B through D which are to be executed originally.

Figure 3:
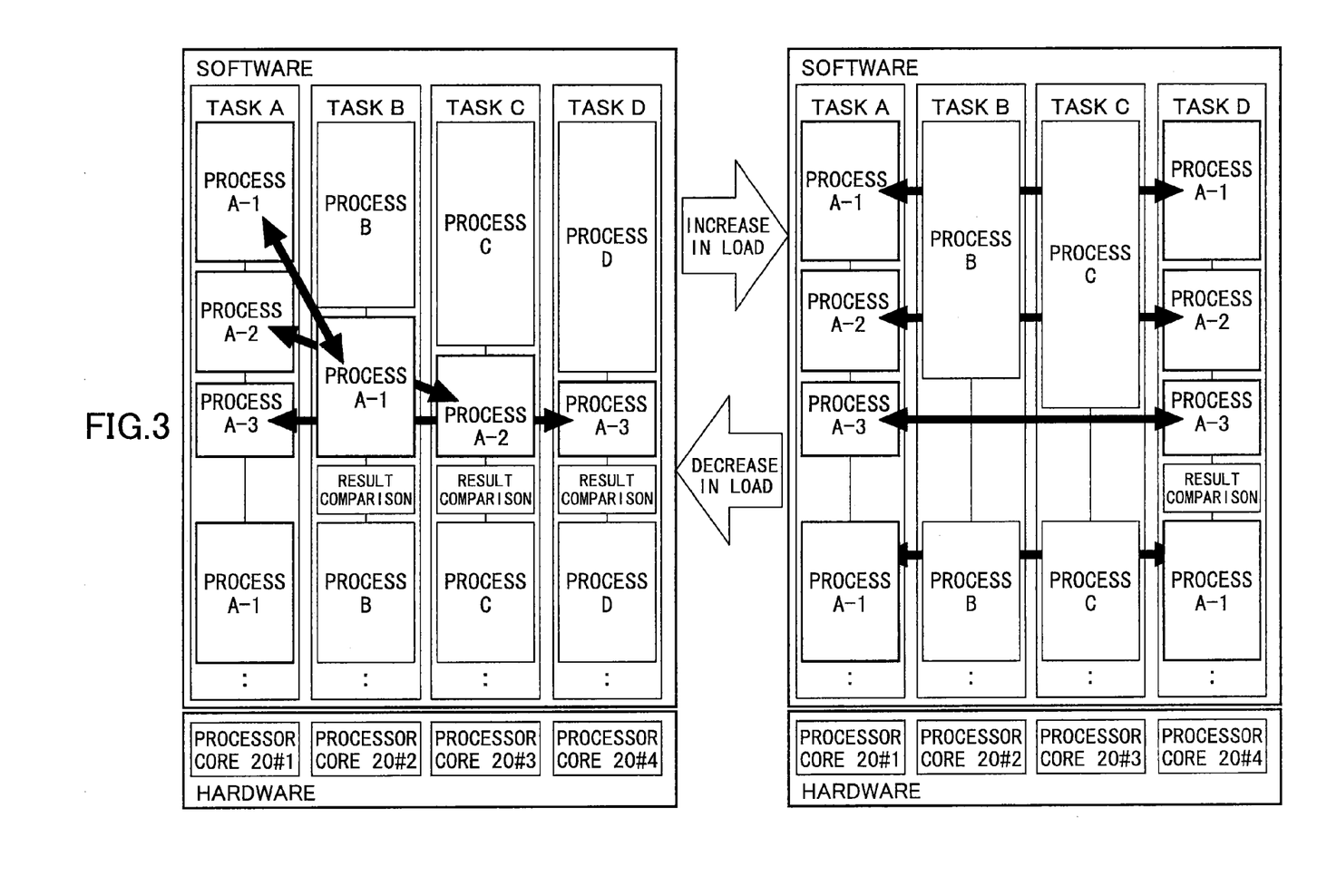
FIG. 3 is a diagram for illustrating a status in which respective processor cores execute tasks according to a task schedule determined by a task scheduler 12A.

FIG. 3 is a diagram for illustrating a status in which respective processor cores execute tasks according to a task schedule determined by the task scheduler 12A. In FIG. 3, the left part illustrates an example of a task processing status in the case where the processing load of the processor cores 20#2 through 20#4 is low (i.e., when the load is reduced), and the right part illustrates an example of a task processing status in the case where the processing load of the processor cores 20#2 through 20#4 is high (i.e., when the load is increased).

As illustrated in FIG. 3, if the processing load of the processor cores 20#2 through 20#4 is low, the processor cores 20#2 through 20#4 are instructed by the task scheduler 12A to perform the monitoring process during respites in the corresponding processes B through D related the allocated tasks B through D. Specifically, the processor cores 20#2 through 20#4 are instructed to perform the same processes A-1, A-2 and A-3 included in the task A (referred to as mirror processes) and the comparison processes by comparing their own process results with the process result of the processor core 20#1. In other words, if the processing load of the processor cores 20#2 through 20#4 is low, the task scheduler 12A instructs the processor cores 20#2 through 20#4 to perform the monitoring process in a distributed manner (in cooperation). Such a status is referred to as a "distributed monitoring mode" hereinafter.

The results of the comparison processes are returned to the operating system 12. If the operating system 12 receives information which indicates that the process result of the processor core 20#1 is different from the process results of the processor cores 20#2 through 20#4, the operating system 12 performs an error process such as (1) instructing the processor core 20#1 to perform the process again, (2) resetting the task A to start from an initialized status, (3) instructing another processor core to execute the task A, etc. It is desirable that the content of the error process is varied in stages according to the number of receptions of the information indicating the process results described above don't match, etc.

It is noted that all the comparison processes may be executed by the operating system 12 at once instead of being executed by the processor cores 20#2 through 20#4, respectively. In this case, the "monitoring process" does not include the "comparison processes".

Here, if the multi-core processor 1 is applied to the controller installed in a movable object such as a vehicle, there is often a case where the tasks A through D are strictly restricted to be executed in a particular order and thus the distributing process is not effective. In other words, the task processes of the respective processor cores need to be executed successively by the corresponding processor cores, and thus relatively long idle time tends to be generated in comparison with a personal computer intended for the home, etc. Thus, there is not a substantial reduction in the performance (i.e., delays in the processes of the tasks B through D to be executed originally) due to the fact that the processor cores 20#2 through 20#4 executes the monitoring process during the respites in the corresponding processes B through D related to the allocated tasks B through D.

On the other hand, if the processing loads of the processor cores 20#2 through 20#4 are high, the task scheduler 12A instructs the processor core, which is performing the task whose priority is relatively low, to perform the mirror processes and the comparison processes in a concentrated manner. Such a status is referred to as a "concentrated monitoring mode" hereinafter.

Here, the term "concentrated" means that the distribution of the mirror processes and the comparison processes is biased with respect to the distributed monitoring mode. For example, the term "concentrated" may indicate a status in which the number of the processor cores which execute the mirror processes and the comparison processes is reduced with respect to the distributed monitoring mode. Further, the term "concentrated" may indicate change in the distribution from a substantially uniform distribution status in which the mirror processes are distributed uniformly in a certain period such as [5 tasks, 5 tasks, 5 tasks] to a biased distribution status such as [2 tasks, 2 tasks, 11 tasks]. In the latter case, the processor core whose distribution is increased is the processor core which is executing the task whose priority is relatively low.

According to an example of the concentrated monitoring mode, the processor core 20#4, which is executing the task D whose priority is the lowest, for example, is instructed by the task scheduler 12A to perform the same processes as the processes A-1, A-2 and A-3 included in the task A in a concentrated manner (by itself in this case) and compare its own process result with the process result of the processor core 20#1. In this case, the execution of the process D related to the task D may be stopped, or the process D related to the task D may be executed during respites in the process for monitoring the processor core 20#1 if the processing load with respect to the mirror processes and the comparison processes is low.

It is noted that also in the concentrated monitoring mode, the "comparison processes" may be executed by the operating system 12 instead of being executed by the processor core 20#4. Further, as described above, in the concentrated monitoring mode, the number of the processor cores which executes the monitoring process is not limited to one. Plural processor cores which are executing the tasks whose priority is relatively low may execute the monitoring process. For example, if the processor cores 20#3 and 20#4 are executing the tasks whose priority is relatively low, the distribution of the mirror processes over the processor cores 20#2, 20#3 and 20#4 may be changed from [5 tasks, 5 tasks, 5 tasks] to [0 task, 7 tasks, 8 tasks].

To the contrary, if there are plural processor cores which are executing the tasks whose priority is the lowest and it is defined that only one processor core performs the monitoring process in the concentrated monitoring mode, the processor core which is to perform the monitoring process may be selected arbitrarily according to a core ID, etc.

With such control, it is possible to make the processor cores 20#2 through 20#4 implement sufficient performance while keeping the reliability of the process result of the processor core 20#1.

In other words, if the processing load of the processor cores 20#2 through 20#4 is low, the processor cores 20#2 through 20#4 are instructed to perform the monitoring process in the distributed manner. Therefore, the reduction in the performance due to the execution of the monitoring process does not become so significant.

Further, if the processing load of the processor cores 20#2 through 20#4 is high, the processor core 20#4, which is executing the task whose priority is the lowest, is instructed to perform the monitoring process in the concentrated manner. Therefore, the processing load for the process for monitoring the processor core 20#1 does not affect the tasks whose priority is higher. Further, by using the processor core 20#4 as a dedicated processor core for the monitoring process as a rule, it is possible to keep the increased reliability of the monitoring process.

Thus, in any case, it is possible to reduce the increase in the processing loads due to the monitoring process while keeping the reliability of the process result of the processor core 20#1.

Figure 4:
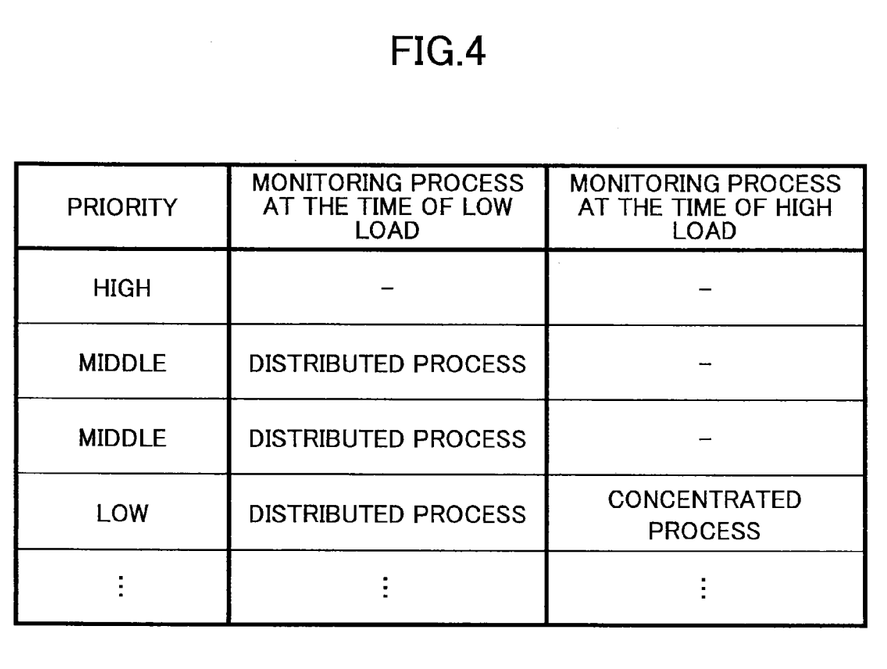
FIG. 4 is a diagram for a relationship between priority of a task and control by the task scheduler 12A.

FIG. 4 is a diagram for a relationship between priority of a task and control by the task scheduler 12A. The task scheduler 12A determines the allocation of the monitoring process according to a rule as illustrated in FIG. 4.

[Process Flow]

Figure 5:
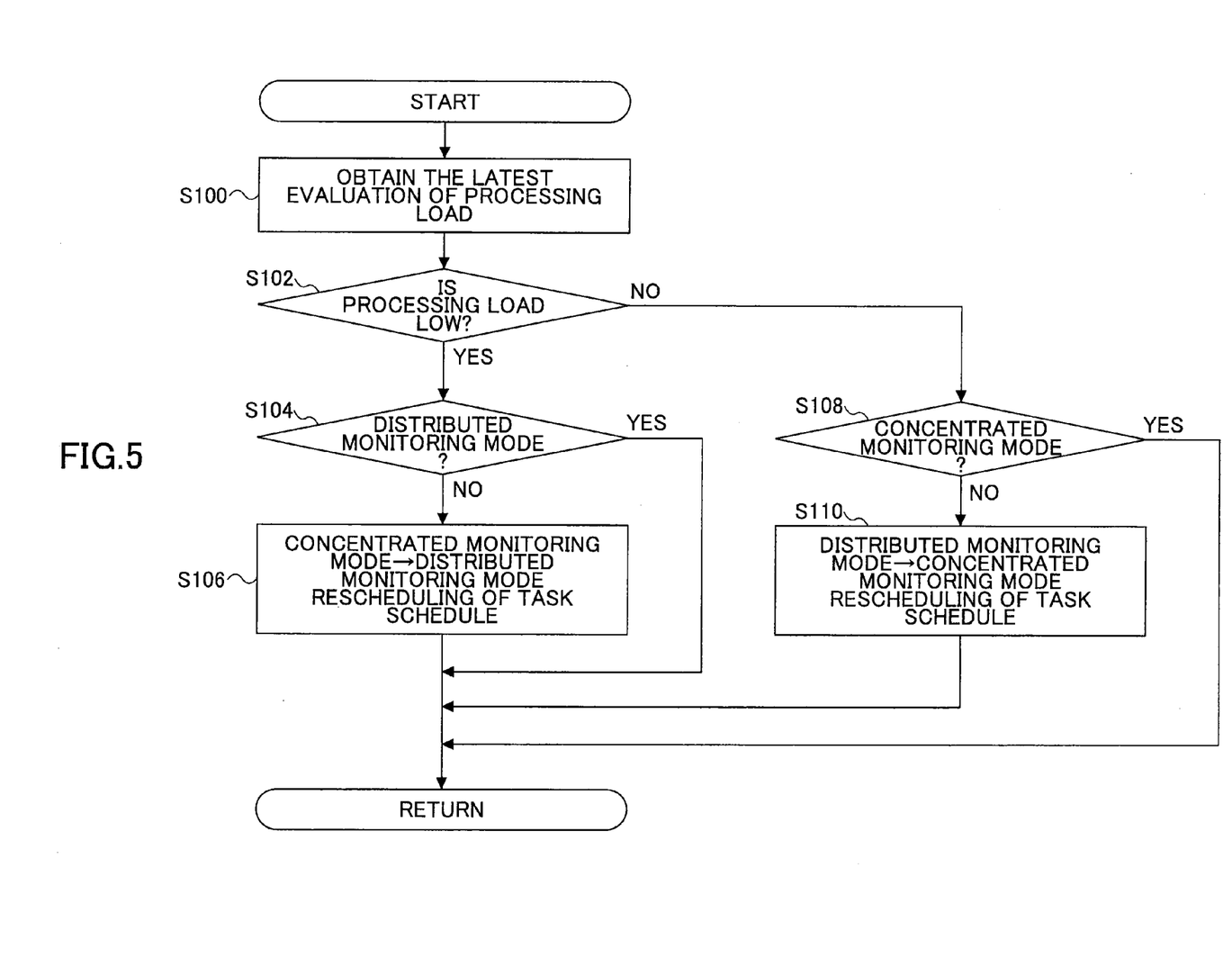
FIG. 5 is a flowchart of a process executed by the task scheduler 12A.

FIG. 5 is a flowchart of a process executed by the task scheduler 12A. The process routine in the flow is executed repeatedly at a predetermined cycle, for example.

First, the task scheduler 12A obtains the latest evaluation result of the processing load evaluating part 12B (S100).

Then, the task scheduler 12A determines whether the evaluation result of the processing load evaluating part 12B indicates that the processing loads of the processor cores 20#2 through 20#4 are low (S102).

If it is determined that the evaluation result of the processing load evaluating part 12B indicates that the processing loads of the processor cores 20#2 through 20#4 are low, it is then determined whether the current monitoring mode is the distributed monitoring mode (S104). If it is determined that the current monitoring mode is the distributed monitoring mode, the process routine ends without performing any further process.

On the other hand, if the task scheduler 12A determines that the current monitoring mode is the concentrated monitoring mode in S104, the task scheduler 12A changes the monitoring mode from the concentrated monitoring mode to the distributed monitoring mode and performs rescheduling of the task schedule (S106).

If it is determined that the evaluation result of the processing load evaluating part 12B indicates that the processing loads of the processor cores 20#2 through 20#4 are high, the task scheduler 12A determines whether the current monitoring mode is the concentrated monitoring mode (S108). If it is determined that the current monitoring mode is the concentrated monitoring mode, the process routine ends without performing any further process.

On the other hand, if the task scheduler 12A determines that the current monitoring mode is the distributed monitoring mode in S106, the task scheduler 12A changes the monitoring mode from the distributed monitoring mode to the concentrated monitoring mode and performs rescheduling of the task schedule (S110).

[Summary]

According to the multi-core processor of the present embodiment described above, it is possible to make the processor cores 20#2 through 20#4 implement sufficient performance while keeping the reliability of the process result of the processor core 20#1.

[Variant, Etc]

The present invention is disclosed with reference to the preferred embodiments. However, it should be understood that the present invention is not limited to the above-described embodiments, and variations and modifications may be made without departing from the scope of the present invention.

For example, in the above-described embodiments, with respect to the monitoring process, the processor cores 20#2 through 20#4 perform the same calculation as the processor core 20#1 and compare the process results with the process result of the processor core 20#1; however, this is not the only way. For example, the monitoring process is implemented by a more simple way, such as performing calculations to check only a few low bits of the process results, checking only a sign, etc.

Further, it may be premised that the monitoring process for the monitored processor core is performed by plural processor cores in a redundant manner. For example, it is assumed that as original tasks of the processor cores, scheduling is performed such that the processor core 20#1 executes the tasks A-1, A-2 and A-3 whose priority is "high", the processor cores 20#2 through 20#6 execute the tasks B, C, D, E and F whose priority is "middle", respectively, and the processor cores 20#7 and 20#8 execute the tasks G and H whose priority is "low", respectively. Here, if the task A-1, among the tasks A-1, A-2 and A-3, requires the longest process time, in the distributed monitoring mode in the case where the processing loads of the respective processor cores are low, the monitoring process is allocated such that the processor cores 20#7 and 20#8 execute the mirror processes and the comparison processes of the task A-1 by themselves, the processor cores 20#5 and 20#6 execute the mirror processes and the comparison processes of the task A-2 by themselves, and the processor cores 20#3 and 20#4 execute the mirror processes and the comparison processes of the task A-3 by themselves, for example. Then, if the transition to the concentrated monitoring mode occurs due to the increase in the processing loads of the respective processor cores, the scheduling is performed such that the processor cores 20#7 and 20#8 stop the execution of the tasks G and H and execute the mirror processes and the comparison processes of the task A-1, A-2 and A-3 by themselves, respectively, for example. With this arrangement, the task to be executed by the processor core 20#1 is subject to the monitoring process by other two or more processor cores regardless of the concentrated monitoring mode or the distributed monitoring mode, which further increases the reliability of the process result of the monitored processor core 20#1.

Further, in the above-described embodiments, the processor core which is performing the task whose priority is the highest (i.e., "high") is the monitored processor core; however, "a particular processor core" may be the monitored processor core. This is because there is no problem if the monitored processor core is fixed in the case where the particular processor core always executes the task whose priority is high. It is noted that there may be plural monitored processor cores.

Further, in the above-described embodiments, the processing load evaluating part 12B evaluates the processing loads of the processor cores 20#2 through 20#4 such that the processing loads of the processor cores 20#2 through 20#4 are high if an average value of the CPU usage percentages exceeds a reference value and low if the average value of the CPU usage percentages is smaller than or equal to the reference value; however, this is not only the way. For example, the processing loads may be evaluated by comparing a weighted mean of the CPU usage percentages (the heavier weighting coefficient is given to the processor core which is performing the task with high priority) or a geometrical average of the CPU usage percentages with the corresponding reference value. Further, indexes other than the CPU usage percentage may be used to evaluate the processing loads.

Further, the areas set in the shared memory 30 may be set in registers or cache memories installed in the respective processor cores.

[Industrial Applicability]

The present invention can be utilized in computer industry, vehicle part manufacturing industry or other various the manufacturing industries.

The invention claimed is:

1. A multi-core processor, comprising:
a monitored processor core whose process result is to be monitored;
a monitoring processor core group including two or more monitoring processors which can perform a process for monitoring the monitored processor core;
an evaluating part configured to evaluate a processing load of the monitoring processor core group; and
a controlling part configured to make the monitoring processor core group perform the process for monitoring the monitored processor core in a distributed manner if the processing load of the monitoring processor core group evaluated by the evaluating part is low, and make only one monitoring processor of the monitoring processor core group perform the process for monitoring the monitored processor core if the processing load of the monitoring processor core group evaluated by the evaluating part is high, the monitoring processor performing a process whose priority is relatively low.

2. The multi-core processor of claim 1, wherein
the controlling part makes the monitoring processor of the monitoring processor core group perform the process for monitoring the monitored processor core if the processing load of the monitoring processor core group evaluated by the evaluating part is high, the monitoring processor performing a process whose priority is the lowest available.

3. The multi-core processor of claim 1, wherein
the evaluating part evaluates the processing load of the monitoring processor core group such that the processing load becomes high if an average value of CPU usage percentages in the monitoring processor core group exceeds a reference value.

4. The multi-core processor of claim 1, wherein
the process for monitoring the monitored processor core includes performing the same process as the monitored processor core and comparing a result of the process with the process result of the monitored processor core.

* * * * *